(12) United States Patent
Frizzell

(10) Patent No.: US 11,383,894 B2
(45) Date of Patent: Jul. 12, 2022

(54) MEASURABLE DISPOSABLE CONTAINER WITH LID

(71) Applicant: Linda Frizzell, Reno, NV (US)

(72) Inventor: Linda Frizzell, Reno, NV (US)

( * ) Notice: Subject to any disclaimer, the term of this patent is extended or adjusted under 35 U.S.C. 154(b) by 71 days.

(21) Appl. No.: 16/787,118

(22) Filed: Feb. 11, 2020

(65) Prior Publication Data

US 2020/0299035 A1    Sep. 24, 2020

Related U.S. Application Data

(60) Provisional application No. 62/821,517, filed on Mar. 21, 2019.

(51) Int. Cl.
*B65D 41/26* (2006.01)

(52) U.S. Cl.
CPC .... *B65D 41/26* (2013.01); *B65D 2543/00046* (2013.01); *B65D 2543/00055* (2013.01); *B65D 2543/00092* (2013.01); *B65D 2543/00268* (2013.01); *B65D 2543/00685* (2013.01); *B65D 2543/00953* (2013.01)

(58) Field of Classification Search
CPC .......... B65D 41/26; B65D 2543/00046; B65D 2543/00055; B65D 2543/00092; B65D 2543/00268; B65D 2543/00685; B65D 2543/00953; A47J 43/27; A47J 43/042
USPC ...................................................... 220/711
See application file for complete search history.

(56) References Cited

U.S. PATENT DOCUMENTS

| | | | | |
|---|---|---|---|---|
| 3,138,371 A | * | 6/1964 | Feher | B65D 23/04 366/341 |
| 3,785,519 A | * | 1/1974 | Huh | B65D 41/42 215/254 |
| 3,920,226 A | * | 11/1975 | Walt | A47J 43/27 366/130 |
| 4,880,312 A | * | 11/1989 | Carlson | B01F 11/0002 366/130 |
| 5,294,014 A | * | 3/1994 | Wyatt | B65D 47/265 220/253 |
| 8,689,988 B2 | * | 4/2014 | Xu | B65D 51/24 215/230 |
| 8,746,958 B2 | * | 6/2014 | Spray | B01F 15/00896 366/130 |
| 2002/0029635 A1 | * | 3/2002 | Kremen | G01F 19/002 73/426 |
| 2005/0247129 A1 | * | 11/2005 | Carragan | G01F 19/00 73/426 |

(Continued)

*Primary Examiner* — J. Gregory Pickett
*Assistant Examiner* — Niki M Eloshway
(74) *Attorney, Agent, or Firm* — Brennan, Manna & Diamond, LLC

(57) ABSTRACT

A disposable, bio-degradable food and beverage storage container, preferably of cardboard construction. The storage container is comprised of a cylindrical body portion and a removable lid having a seal that is also comprised of a biodegradable material. The interior surface of the body portion of the storage container is further comprised of an embossed portion line and a portion indicator. In one embodiment of the storage container, the body portion comprises a pair of opposing and spaced apart mixers fixedly attached to the interior surface for the mixing and/or agitation of the contents of the storage device in a spill-proof manner.

12 Claims, 5 Drawing Sheets

(56) References Cited

U.S. PATENT DOCUMENTS

| | | | | |
|---|---|---|---|---|
| 2006/0027588 A1* | 2/2006 | Mackovic-Basic | ......................... | |
| | | | B65D 47/265 | |
| | | | | 220/795 |
| 2012/0125931 A1* | 5/2012 | Roth | .................. B65D 47/0895 | |
| | | | | 220/254.3 |
| 2013/0233898 A1* | 9/2013 | Resnikoff | .......... A47G 19/2272 | |
| | | | | 222/568 |
| 2013/0280385 A1* | 10/2013 | Arns | ....................... A47J 43/07 | |
| | | | | 426/100 |
| 2014/0054306 A1* | 2/2014 | Panek | ................ B65D 43/0214 | |
| | | | | 220/713 |
| 2016/0000245 A1* | 1/2016 | Sims | ...................... B65D 41/04 | |
| | | | | 220/253 |
| 2017/0360226 A1* | 12/2017 | Zeidan | ............... A47G 19/2227 | |

* cited by examiner

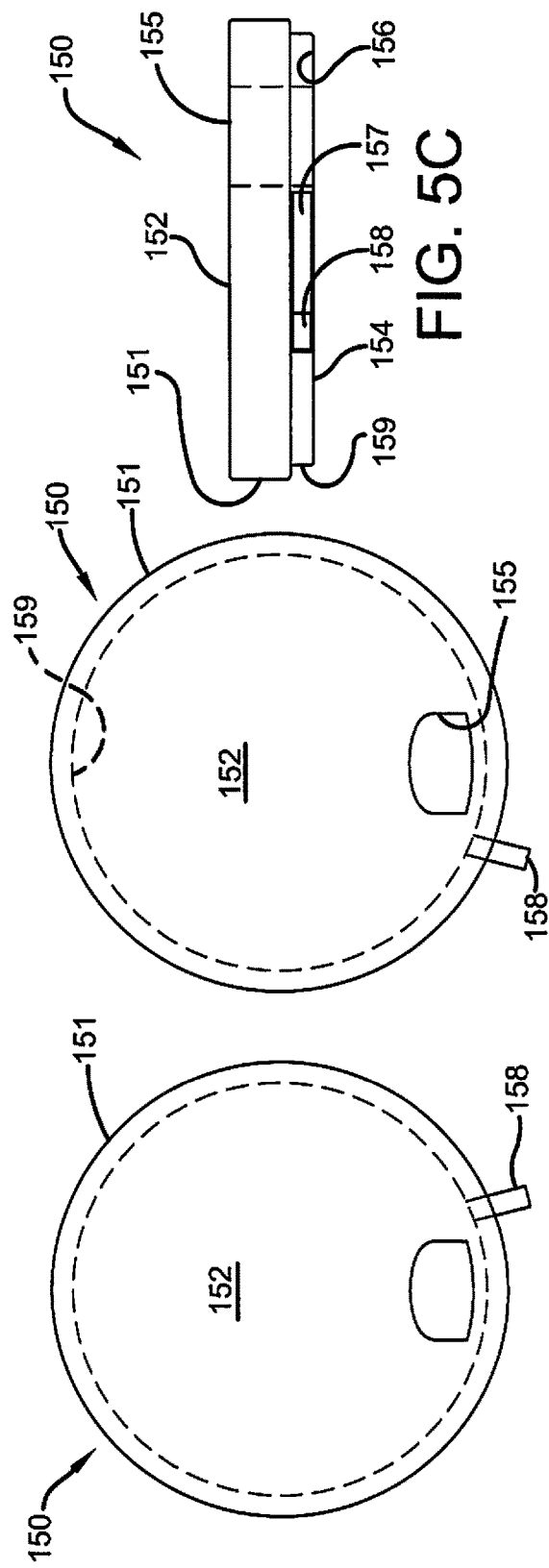
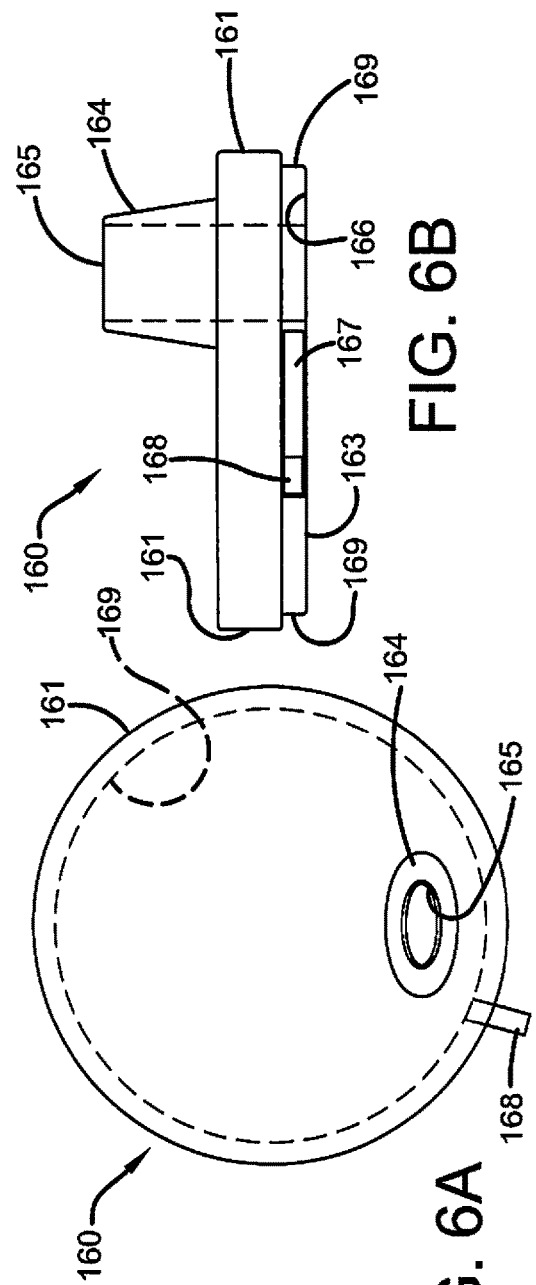

MEASURABLE DISPOSABLE CONTAINER WITH LID

CROSS-REFERENCE TO RELATED APPLICATION

The present application claims priority to and the benefit of U.S. Provisional Application No. 62/821,517 filed on Mar. 21, 2019, which is incorporated herein by reference in its entirety.

BACKGROUND

The present invention relates generally to a new and improved disposable storage container device designed specifically for use with food and/or beverages. More specifically, the invention relates to bio-degradable, disposable, and lockable food and beverage storage container of cardboard/paper-based construction and with internal portion measurement lines and indicators contained thereon. Accordingly, the present specification makes specific reference thereto. However, it is to be appreciated that aspects of the present invention are also equally amenable to other like applications, devices and methods of manufacture.

Many individuals who pursue a healthy lifestyle do so by eating healthy foods and regularly exercising. For those who take the former seriously, preparing healthy and nutritious meals is an extremely important facet of their lifestyle. During the preparation of a meal, being conscious of all macronutrients contained within said meal is of foremost priority. Macronutrients, which include carbohydrates, fats, proteins and the like, determine the total calories that an item of food or food ingredients contain. Many individuals track the total amount of calories and macronutrients that they consume each day, and subsequently plan their meals to specifically meet certain caloric and macronutrient goals that they set for themselves in order to gain, lose, or maintain weight.

In order to control the total calories and macronutrients of each food product, product ingredient and/or meal that an individual consumes in a given day, an individual typically must measure and/or weigh the food product and/or product ingredient. This is due to the fact that a predetermined amount of food contains a predetermined amount of calories/macronutrients, and said predetermination makes meal planning and monitoring total calories consumed much easier for an individual. Common units of measurement for measuring solid and liquid foods include measuring weight by pounds, ounces, and grams, and measuring volume by imperial units such as teaspoons, tablespoons, cups, ounces, pints, quarts, and gallons.

Additionally, it is important for an individual that engages in such meal planning and preparation to be able to safely and efficiently transport the prepared meals from place to place such as to and from home, work, the gym, recreational activities, etc. In order to transport said prepared meals, a variety of plastic and cardboard/paper-based food storage containers exist, some even specifically made for individuals that meal prep. However, existing plastic, cardboard and/or paper-based food and beverage storage containers possess several inherent drawbacks and limitations.

For example and without limitation, many existing plastic food and beverage containers require regular maintenance and cleaning on the part of the individual as they must be washed and dried after every use to prevent the same from becoming contaminated or germ ridden, which can be both time consuming and inconvenient. In addition, plastic containers allow for the possibility of certain foods that include sauces or other liquids to potentially stain the walls of the container with their color and make it very difficult for a user to successfully clean the same, thereby rendering the container unsightly. Such plastic containers may also semi-permanently retain the smell of the food items that were placed therein, even after several repeated washes.

If a plastic container becomes stained, damaged (for example from being dropped or worn out from repeated washings, re-heatings, etc.), or begins to retain smell, an individual may choose to discard the plastic container into a waste stream that typically ends with the plastic container being disposed of in a landfill. From an environmental standpoint, this is a less than optimal result as plastic can take up to 1,000 years to fully decompose in a landfill. Further, during this very prolonged decomposition period, the plastic may release harmful chemicals into the environment in the form of gasses, liquids and solids that can be released into the atmosphere and/or seep into the soil, groundwater and surrounding ecosystems. Some of the chemicals that may leach into the soil act functionally similar to the hormone estrogen, which can produce harmful effects on both humans and animals.

One of the specific estrogen-like chemicals is Bisphenol A (BPA). More specifically, Bisphenol A is a chemical additive used in the plastic manufacturing industry to add strength and resilience to certain types of plastics. Many food storage container products, as well as other plastic products, contain BPAs. Further, analysis of the molecular structure of BPA has found that it is structurally similar to estrogen and capable of binding to estrogen receptors, and can thereby influence or alter bodily processes including, without limitation, growth, cell division and repair, fetal development, energy levels, and reproduction. In addition, BPA may also interact with other hormone receptors, such as thyroid receptors and can also potentially alter their function.

Studies have also shown that BPA can negatively affect fertility. For example, one study by the Department of Obstetrics and Gynecology of the Nagoya City University of Medicine School has found that women with frequent miscarriages had about three times as much BPA in their blood as women with successful pregnancies. Subsequent studies have shown that women undergoing fertility treatments that have higher levels of BPA have lower egg production and are up to two times less likely to become pregnant. In addition to potentially becoming exposed to BPAs from landfill seepage, individuals are also potentially exposed to BPAs every time they use a plastic storage container that was manufactured using BPAs.

In an effort to circumvent the potentially harmful affects of BPA in plastic containers, many manufacturers have elected to produce food and/or beverage storage containers that are comprised of cardboard or other similar paper-based material. While these types of containers do not contain any of the harmful chemicals (e.g., BPA, etc.) that are used in plastics manufacturing, said containers suffer from a number of inherent design and functional limitations. For example, one notable limitation associated with such containers is their inability to completely seal in their contents. More specifically, cardboard/paper-based containers lack the sealing functionality of plastic containers, which oftentimes results in the spilling or leaking of the contents of the container. This type of spillage or leaking most commonly occurs when the food and/or beverage storage container is dropped or suddenly repositioned, thereby resulting in the lid becoming dislodged, even to the slightest degree.

As noted previously, many individuals that meal prep pre-portion/pre-measure their food for each meal. This portioning/measuring is done almost exclusively outside of the container that the food/meal will ultimately be stored/transported in. Some existing plastic/cardboard meal prep containers are comprised of compartmentalized sections of a given volume, however this volume is not readily displayed on the container itself. In addition, this volume is not typically designed to correspond with common conventional exact food portions as for example, eight ounces. Thus, an inability to measure/portion food solely within the food storage container that the food is to be transported or stored in exists in nearly all existing plastic and cardboard-based food storage containers.

Therefore, there exists a long felt need in the art for an improved food and/or beverage storage container and, more specifically, a bio-degradable cardboard/paper-based food and/or beverage storage container. There is also a long felt need in the art for an improved food and/or beverage storage container device that allows the user to portion/measure and mix food and/or beverage solely within the container, and without the need for additional tools such as external mixers, measuring spoons, cups and the like. Additionally, there is a long felt need in the art for an improved cardboard/paper-based food and/or beverage storage container and associated lid with enhanced sealing capabilities to prevent leaks and spills. Finally, there is a long felt need in the art for an improved food and/or beverage storage container that is relatively inexpensive to manufacture, and simple and easy to use. The present invention discloses a bio-degradable and disposable cardboard based food and/or beverage storage container that is comprised of a lid with a locking mechanism and seal, as well a visible measurement/portion indicators displayed on the interior face of the device.

More specifically, the present invention in one exemplary embodiment, discloses a food or beverage storage container of bio-degradable and disposable cardboard composition that comprises a body portion and a corresponding lid portion that is repositionable relative to the body portion between a locked position and an unlocked position. The lid portion further comprises an integrated seal or gasket that forms a generally waterproof seal between the body portion and the lip portion when the lid portion is in a locked position to ensure that no leakage of the contents of the container occurs.

Additionally, the interior surface of the body portion further comprises a plurality of portion lines and portion indicators that may be embossed in a raised fashion along the interior surface to enable the user to quickly fill the container with a desired level or amount of food and/or beverage contents to assist the user with meal preparation and dieting. In a preferred embodiment of the present invention, the portion lines and portion indicators may be positioned along the entire inner circumference of the body portion of the container to enable the user to view the same from any angle.

In an alternative embodiment of the improved container of the present invention, a mixer or food and/or beverage agitator may also be fixedly attached to the interior surface of the container to enable the user to quickly mix various food and/or beverage products to create a meal, such as a shake, in said container. More specifically, the mixer or agitator may be comprised of opposed longitudinal and lateral frame members forming openings therein for better mixing capabilities, as explained more fully below and depicted in the FIGS. Additionally, further alternative embodiments of the lid portion having different configurations and/or locking/sealing properties are also described herein to enable the user to better secure the food and/or beverage contents of the improved container, and without fear of leaking or spillage.

In this manner, the improved food and/or beverage storage container device of the present invention accomplishes all of the forgoing objectives, thereby improving the ability of a user to successfully transport food and/or beverage within a disposable and bio-degradable cardboard container, while avoiding both leaking and spilling of said food and beverage, and exposure to harmful chemicals such as BPAs that may be present in alternative plastic storage containers. The improved food and beverage storage container of the present invention also allows a user to measure or pre-portion their food and/or beverages within the container itself, instead of doing so outside of the container and then placing the measured/portioned contents into the container.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an improved food and beverage storage container of bio-degradable and disposable cardboard construction. The food and beverage storage container device preferably comprises a generally cylindrical body portion and a lid portion. The body portion is preferably comprised of a top, a bottom, an exterior surface, a threaded raised lip portion, an interior, and an interior surface, and the lid portion is preferably comprised of a top surface, one or more stepped portions, a lip receiving portion and a gasket or seal. More specifically, the raised lip of the body portion further comprises external treads for mating engagement with corresponding internal threads on the lip receiving portion and the gasket/seal functions to create a waterproof seal between the body and lid portions to prevent unwanted spills and leaks.

Additionally, the interior surface of the body portion further comprises one or more portion lines and corresponding portion indicators which are preferably embossed therein in a raised fashion to permit the user to precisely and accurately fill the disposable and biodegradable container with a desired amount of a food product or beverage. More specifically, to utilize the container device, a user (not shown) simply fills the body portion of the container with their desired food or beverage until the amount of the food/beverage reaches the desired portion line. The user then places the lid on the body portion device, and turns it in a clockwise direction to matingly engage the threads of the body and lid portions to lock the container device. Further, the presence of the gasket/seal creates a waterproof seal between the body and lid portions to prevent unwanted spills and leaks. When a user desires to consume or otherwise access the contents of the container, the user will simply unlock the lid by twisting it in a counter-clockwise motion. Once the contents have been consumed, the bio-degradable container may be properly disposed of or recycled.

In a further embodiment of the bio-degradable and disposable container of the present invention, the body portion further comprises one or more integral agitators or mixers for mixing the contents of the container. More specifically, the body portion preferably comprises two, spaced apart and opposing mixers fixedly attached to, or integrally formed with, the interior surface of the body portion, each having a longitudinal frame member and a plurality of lateral frame members that combine for form a plurality of openings therein. Mixers are also preferably comprised of a bio-degradable materials, such as cardboard, paper, etc. This embodiment of the present invention can be used, for example, to prepare a protein shake by the user following the same procedure as described above, but then, after the lid is sealed, the user would shake the entire container in a circular and/or up and down motion to ensure proper agitation/mixing of the protein shake ingredients.

Finally, additional embodiments of the lid portion of the disposable and bio-degradable container of the present invention are also disclosed herein. For example, it is contemplated that the lid portion could further comprise a continuous opening and a repositionable closure mechanism for opening or closing the continuous opening, thereby permitting the user to consume the contents of the disposable and bio-degradable container without removing the lid portion. It is further contemplated that the lid portion could also comprise a spout.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 5A illustrates a top perspective view of an alternative embodiment of the removable lid portion of the food storage container device of the present invention and further comprising a closure mechanism positioned in the closed position and in accordance with the disclosed architecture.

FIG. 5B illustrates a top perspective view of the removable lid portion of FIG. 5A with the closure mechanism positioned in the opened position in accordance with the disclosed architecture.

FIG. 5C illustrates a side elevational view of the removable lid portion of FIG. 5A with the closure mechanism positioned in the opened position in accordance with the disclosed architecture.

FIG. 6A illustrates a top perspective view of a further alternative embodiment of the removable lid portion of the food storage container device of the present invention and further comprising a spout and a closure mechanism positioned in the opened position and in accordance with the disclosed architecture.

FIG. 6B illustrates a side elevational view of the removable lid portion of FIG. 6A with the closure mechanism positioned in the opened position in accordance with the disclosed architecture.

DETAILED DESCRIPTION

Figure 1:
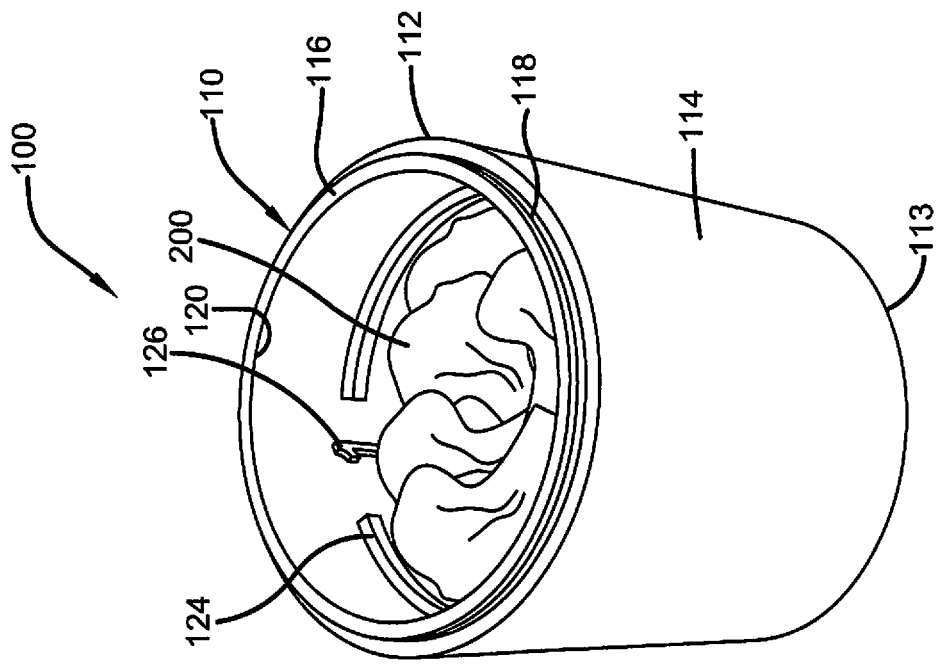
FIG. 1 illustrates a perspective view of one embodiment of the food and beverage storage container of the present invention with the lid removed from the cylindrical body portion in accordance with the disclosed architecture.
Figure 1:
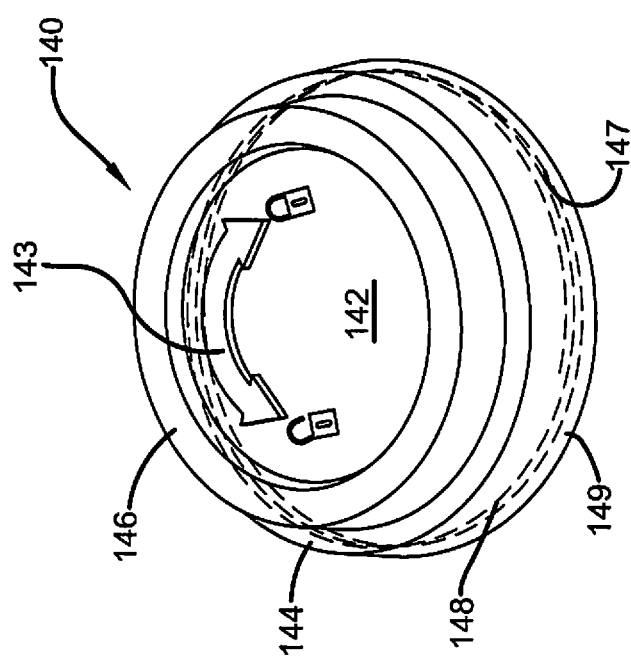

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists in the art a long felt need for a food and/or beverage storage container made entirely out of bio-degradable cardboard/paper-based construction, and that allows the user to portion/measure and mix food and/or beverage solely within the container in a precise and accurate manner, and without the need for additional tools such as external mixers, measuring spoons, cups and the like. Additionally, there is a long felt need in the art for an improved cardboard/paper-based food and/or beverage storage container and associated lid with enhanced sealing capabilities to prevent leaks and spills, and for an improved food and/or beverage storage container that is relatively inexpensive to manufacture, and simple and easy to use.

Referring initially to the drawings, FIG. 1 illustrates a perspective view of one embodiment of the food and beverage storage container 100 of the present invention and having a body portion 110, and a corresponding removable lid 140. Unless otherwise stated herein, each of body portion 110 and removable lid 140, and their various components, are comprised of a disposable bio-degradable material, such as cardboard, paper or the like.

Body portion 110 is preferably generally cylindrical in shape and is comprised of a top 112, a bottom 113, an exterior surface 114 extending between said top 112 and bottom 113, a raised lip 116 extending outwardly from top 112 in a direction opposite of bottom 113, an interior 120, and an interior surface 122. Exterior surface 114 may further comprise any user preferred or specified color, ornamentation and/or or wording (not shown), and raised lip 116 preferably comprises a plurality of external threads 118 extending outwardly therefrom for mating engagement with a corresponding set of threads on the lid 140 and to lock container device 100 in a spill and leak proof manner, as described more fully below.

Figure 3:
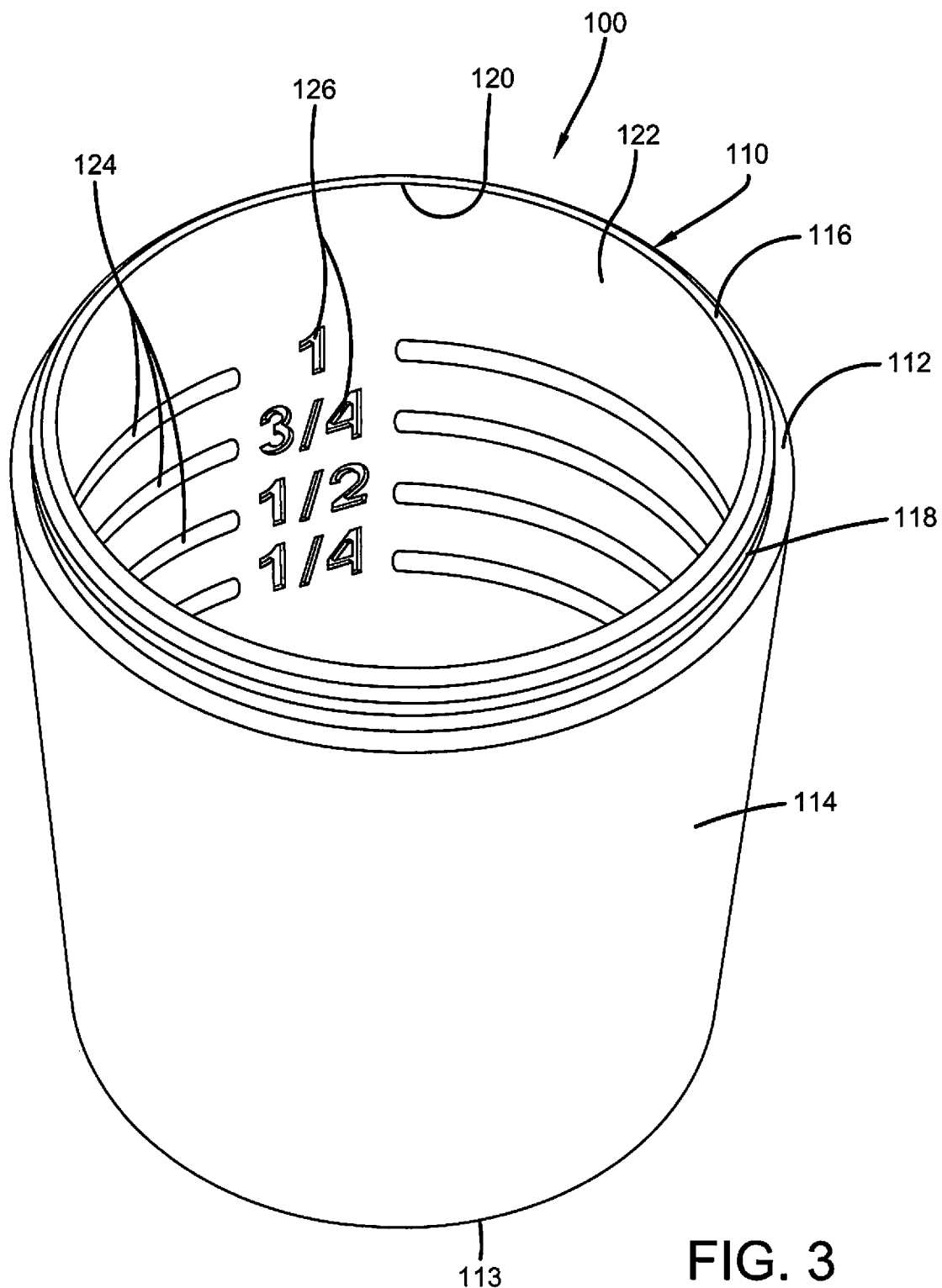
FIG. 3 illustrates a perspective view of the generally cylindrical body portion of the storage container device of FIG. 1 and illustrating the portion lines and portion indicators embossed on an interior surface thereof in accordance with the disclosed architecture.

As best shown in FIG. 3, interior surface 122 preferably further comprises a portion line 124 and a corresponding portion indicator 126 for enabling a user to fill the interior 120 of the body portion 110 with food and/or beverage contents 200 to a desired level in a precise and accurate fashion. Each of portion line 124 and corresponding portion indicator 126 are preferably embossed on the interior surface 122 in a raised, braille like fashion, and portion line 124 preferably extends along the entire interior circumference of interior surface 122 so that portion line 124 is visible by the user from virtually any angle, thereby adding to the convenience of the disposable and bio-degradable container 100. Further, each of portion line 124 and a corresponding portion indicator 126 could be manufactured to represent a particular volume such as, by way of example and not limitation, ¼ cup, ⅓ cup, ¾ cups, and 1 cup. However, other embodiments of the container 100 of the present invention can be comprised of measurement/portion lines 124 and their respective indicators 126 that feature a variety of units that include, but are not limited to: teaspoons, tablespoons, cups, ounces, pints, quarts, and gallons, among other units of measurement.

Figure 2:
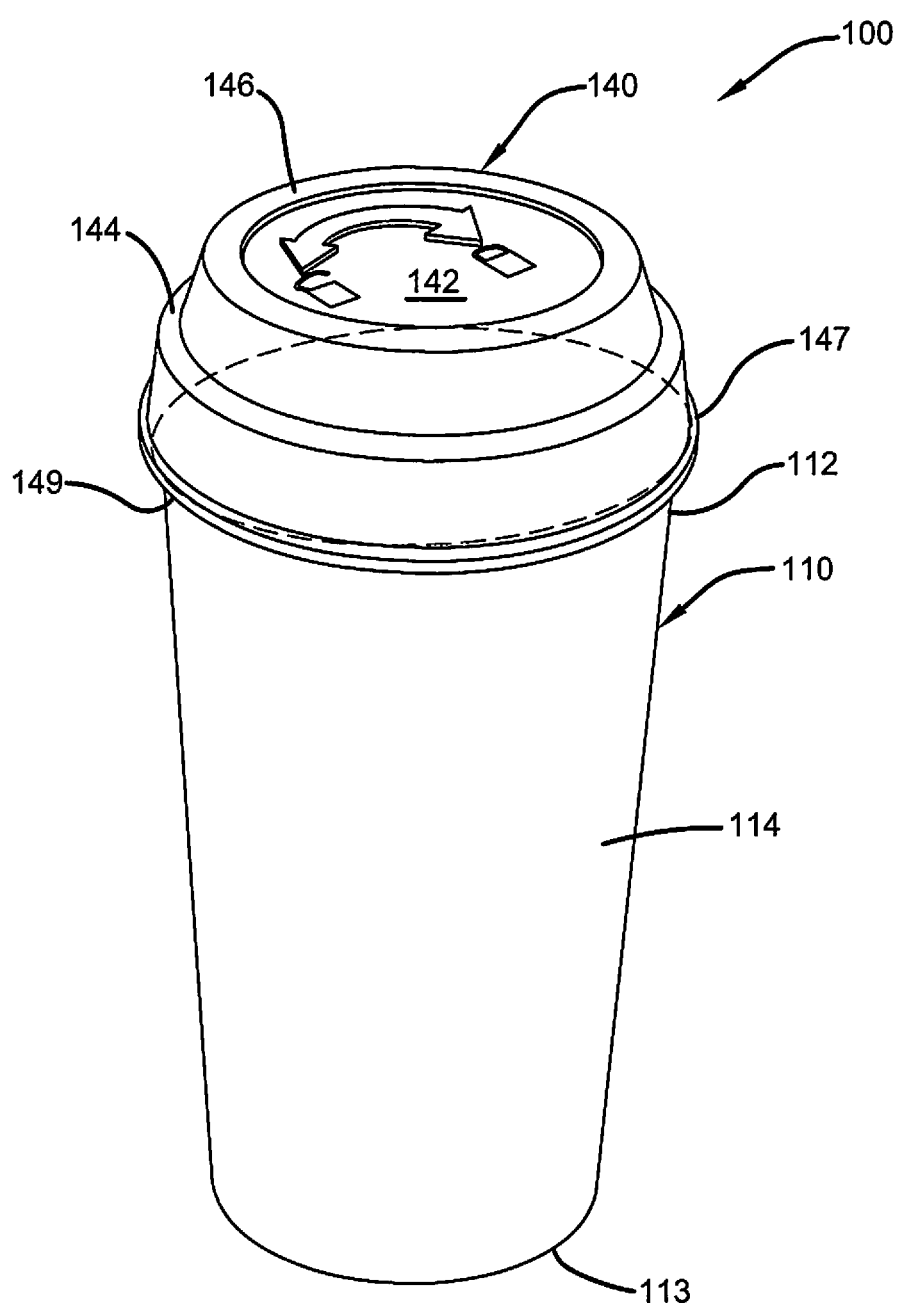
FIG. 2 illustrates a perspective view of the food and beverage storage container of FIG. 1 with the removable lid securely attached to the cylindrical body portion to prevent spillage and in accordance with the disclosed architecture.

As best shown in FIGS. 1 and 2, one embodiment of lid portion 140 may comprise a top surface 142 having a lock indicator positioned thereon for instructing a user on how to lock or unlock the lid, a first stepped portion 144, a second stepped portion 146, a lip receiving portion 147 and a gasket or seal 149, though it is contemplated that lid 140 could have more or less stepped portions to suit user need and/or preference. Similar to external threads 118 on raised lip 116, lip receiving portion 147 is further comprised of a plurality of interior or internal threads 148 that correspond to external threads 118 to enable lid 140 to be secured to body portion 110, as best shown in FIG. 2. More specifically, a user (not shown) desiring to attach lid 140 to body portion 110 would simply align the lip receiving portion 147 of the lid 140 with the raised lip 116 of the body portion 110 and rotate the lid 140 in a clockwise motion to lock the lid 140 in place atop body portion 110, consistent with the lock indicator 143 instructions positioned on top surface 142. Further, as the lid 140 is screwed onto body portion 110, gasket/seal 149 is compressed therebetween to form a generally watertight seal that prevents unwanted leaks and spillage from container 100. As noted above, each of body portion 110 and lid 140, and their various components, are comprised of a disposable and bio-degradable material, such as cardboard, paper and the like, though it is specifically contemplated that gasket/seal 149 could also be comprised of a spill proof cork or like gasket.

By comparison, to remove the lid 140 from the body portion 110, for example, to access the contents 200 of disposable and bio-degradable container 100, the user (not shown) will simply unlock the lid 140 by twisting it in a counter-clockwise motion, consistent with the instructions provide by lock indicator 143 on top surface 142. Once the contents 200 have been consumed, the bio-degradable container 100 may be properly disposed of or recycled. Notwithstanding the forgoing, it is also contemplated that a tongue and grove locking mechanism, locking lever mechanism, friction fit or other locking mechanism could be used, as opposed to external threads 118 and internal threads 148, to removably secure lid 140 to body portion 110. In fact, an example of one such possible friction fit locking mechanism is described below.

Figure 4B:
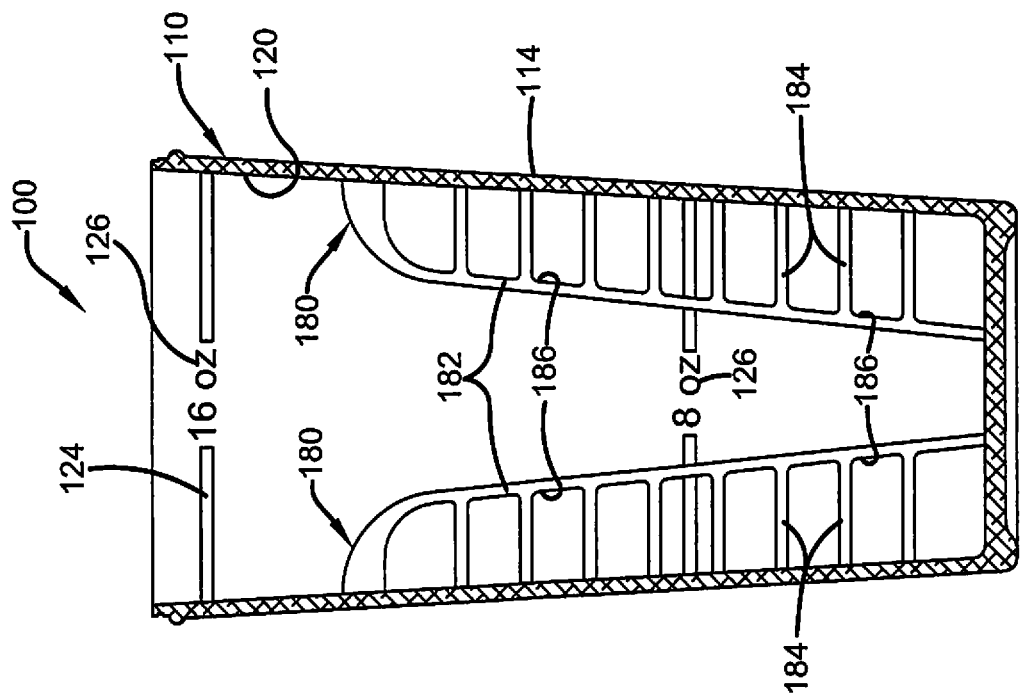
FIG. 4B illustrates a cross-sectional view of the cylindrical body portion of the food storage container device of FIG. 4A at cut line A-A and in accordance with the disclosed architecture.
Figure 4A:
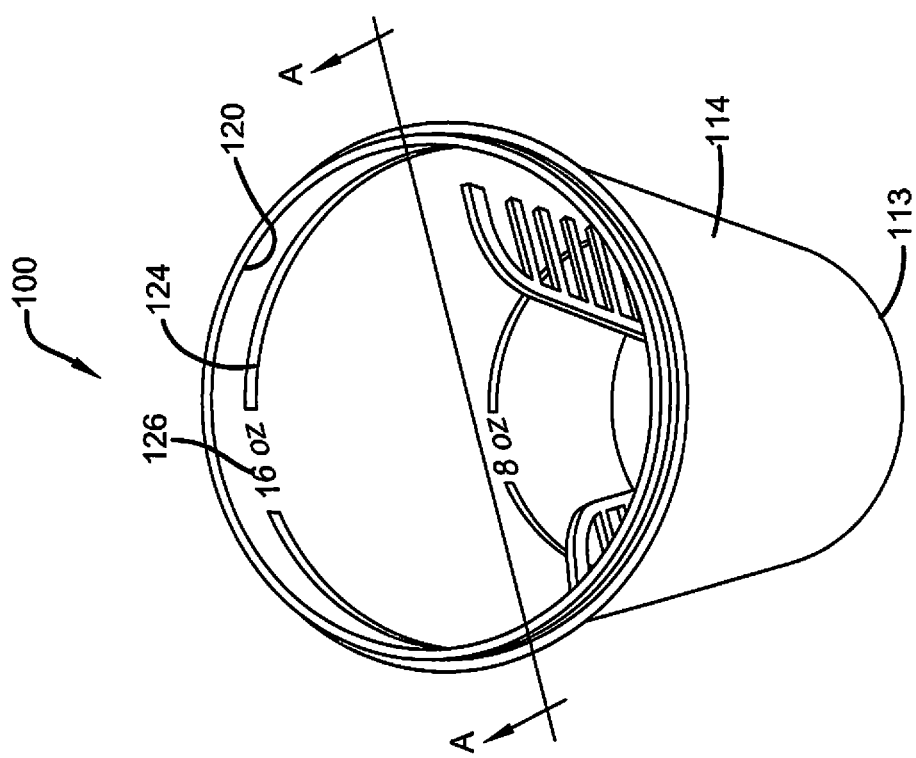
FIG. 4A illustrates a perspective view of an alternative embodiment of the generally cylindrical body of the food storage container device of the present invention further comprising a pair of spaced apart and opposing mixers in accordance with the disclosed architecture.

FIG. 4A illustrates a perspective view of an alternative embodiment of the cylindrical body portion 110 of the food and beverage storage container 100 of the present invention and further comprising a pair of spaced apart and opposing agitators or mixers 180 positioned in the interior 120 of body portion 110 in accordance with the disclosed architecture, and FIG. 4B illustrates a cross-sectional view of the cylindrical body portion 110 of the food and beverage storage container device 100 of FIG. 4A at cut line A-A. More specifically, each of mixers 180 are preferably fixedly attached to, or integrally formed with, the interior surface 122 and extend outwardly into the interior 120 of body portion 110. Further, each of mixers 180 are also preferably comprised of a disposable and bio-degradable material such as cardboard, paper, etc., and is further comprised of a generally longitudinal frame member 182 and a plurality of laterally frame members 184, forming a plurality of openings 186 therein, as best shown in FIGS. 4A and 4B.

Containers 100 having mixers 180 can be used, for example, to prepare a protein shake by the user. More specifically, to utilize the disposable and bio-degradable container 100, a user (not shown) simply fills the body portion 110 with their desired food or beverage content 200 until the amount of the contents 200 reaches the desired portion line 124 and its corresponding portion indicator 126, thereby ensuring accurate and precise measurements each time. The user then places the lid 140 on the body portion 110 and turns it in a clockwise direction to matingly engage the external threads 118 of the body portion 110 with the internal threads 148 of the lid 140, and to compress the gasket/seal 149 therebetween to form a generally waterproof seal to prevent unwanted spills and leaks of the contents 200. Once properly sealed, the user can then shake the entire container 100 in a generally circular and/or up and down motion to ensure proper agitation/mixing of the contents 200 by mixers 180. Once mixing is complete, the user can access the mixed contents 200 by simply twisting the lid 140 in a counter-clockwise motion, consistent with the instructions of the lock indicator 143 on top surface 142 of lid 140. Once the contents 200 have been consumed, the bio-degradable container 100 may be properly disposed of or recycled.

FIG. 5A illustrates a top perspective view of an alternative embodiment of a removable lid portion 150 of the food and beverage storage container 100 of the present invention, and further comprising a closure 157 positioned in the closed position in accordance with the disclosed architecture. More specifically, lid portion 150 further comprises a generally cylindrical exterior 151, a top surface 152, a generally cylindrical bottom portion 154 having a diameter that is slightly smaller than exterior 151, a continuous opening 155, a slot 156, a tab 158 and a gasket/seal 159. Unless otherwise stated herein, lid portion 150, and its various components, are comprised of a disposable bio-degradable material, such as cardboard, paper and the like.

FIG. 5B illustrates a top perspective view of the removable lid portion 150 of FIG. 5A with the closure mechanism 157 positioned in the opened position in accordance with the disclosed architecture. More specifically, continuous opening 155 extends between top surface 152 and bottom portion 154 and, when closure 157 is in the open position, is in fluid communication with the interior 120 of body portion 110 such that the contents 200 of the disposable and bio-degradable container 200 can flow through continuous opening 155 to the user.

FIG. 5C illustrates a side elevational view of the removable lid portion 150 of FIG. 5A with the closure mechanism 157 positioned in the open position in accordance with the disclosed architecture. More specifically, tab 158 is fixedly attached to closure 157 such that the repositioning of tab 158 within slot 156 in bottom portion 154 causes the closure to move between an "open" position, as best shown in FIGS. 5B and 5C and defined as not interfering with opening 155, and a "closed" position, as best shown in FIG. 5A and defined as interfering or completely sealing off opening 155 to prevent the contents 200 from passing therethrough.

Additionally, gasket/seal 159 is preferably comprised of a biodegradable material such as cardboard, paper, spill proof cork or like gasket, and is positioned along the generally circular exterior surface of bottom portion 154 such that when bottom portion 154 is inserted into the interior 120 of body portion 110, seal 159 comes into contact with the interior surface 122 of body portion 110 adjacent to raised lip 116 and/or top 112 (if raised lip is not present) and forms a friction fit and seal therebetween to prevent unwanted spillage or leakage.

FIG. 6A illustrates a top perspective view of a further alternative embodiment of a removable lid portion 160 of the food and beverage storage container 100 of the present invention and further comprising a spout 164 and a closure mechanism 167 positioned in the opened position and in accordance with the disclosed architecture. More specifically, and much like lid portion 150, lid portion 160 further comprises a generally cylindrical exterior 161, a top surface 162, a generally cylindrical bottom portion 153 having a diameter that is slightly smaller than exterior 161, a continuous opening 165, a slot 166, a tab 168 and a gasket/seal 169. Unless otherwise stated herein, alternative lid portion 160, and its various components, are comprised of a disposable bio-degradable material, such as cardboard, paper and the like.

Continuous opening 165 extends through spout 164, top surface 162 and bottom portion 164 and, when closure 167 is in the open position, is in fluid communication with the interior 120 of body portion 110 such that the contents 200 of the disposable and bio-degradable container 200 can flow through continuous opening 165 in spout 164 and to the user (not shown).

FIG. 6B illustrates a side elevational view of the removable lid portion 160 of FIG. 6A with the closure mechanism 167 positioned in the open position in accordance with the disclosed architecture. More specifically, tab 168 is fixedly attached to closure 167 such that the repositioning of tab 168 within slot 166 in bottom portion 163 causes the closure 167 to move between an "open" position, as best shown in FIGS. 6A and 6B and defined as not interfering with opening 165, and a "closed" position (not shown), defined as interfering or completely sealing off opening 165.

Additionally, gasket/seal 169 is preferably comprised of a biodegradable material such as cardboard, paper, spill proof cork or like gasket, and is positioned along the generally circular exterior surface of bottom portion 163 such that when bottom portion 163 is inserted into the interior 120 of body portion 110, seal 169 comes into contact with the interior surface 122 of body portion 110 adjacent to raised lip 116 and/or top 112 (if raised lip is not present) and forms a friction fit and seal therebetween to prevent unwanted spillage or leakage.

Notwithstanding the forgoing, the improved food and beverage biodegradable container 100 can by any suitable size, shape, and configuration as is known in the art without affecting the overall concept of the invention, provided that it accomplishes the above stated objectives. One of ordinary skill in the art will appreciate that the shape and size of the container 100 and its various components including measurement units and increments, as show in the FIGS. are for illustrative purposes only, and that many other shapes and sizes of the container 100 are well within the scope of the present disclosure. Although dimensions of the container 100 and its components (i.e., length, width, and height) are important design parameters for good performance, the container 100 and its various components may be any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A disposable food and beverage storage container comprising:
    a cylindrical body having an interior surface, the interior surface comprising an embossed portion indicator and an embossed portion line extending entirely along an interior circumference of the cylindrical body so that the embossed portion line and the embossed portion indicator are visible from any viewing angle; and
    a removable lid comprising a lock indicator positioned on a top surface of the removable lid configured to instruct a user how to lock and unlock the removable lid to the cylindrical body;
    a pair of opposing and spaced apart mixers fixedly attached to the interior surface of the cylindrical body wherein each of the pair of mixers is comprised of a longitudinal frame member, a plurality of lateral frame members and a plurality of openings formed between each of the plurality of lateral frame members; and
    wherein the cylindrical body and the removable lid are comprised of a biodegradable material.

2. The disposable food and beverage storage container of claim 1,
    wherein the bio-degradable material is comprised of cardboard.

3. The disposable food and beverage storage container of claim 1, wherein the removable lid further comprises a seal.

4. The disposable food and beverage storage container of claim 3, wherein the seal is comprised of a biodegradable material.

5. The disposable food and beverage storage container of claim 4, wherein the biodegradable material is cork.

6. The disposable food and beverage storage container of claim 1 further comprising a pair of opposing and spaced apart mixers fixedly attached to the interior surface of the cylindrical body.

7. The disposable food and beverage storage container of claim 6, wherein each of the pair of mixers is comprised of a longitudinal frame member, a plurality of lateral frame members and a plurality of openings.

8. A disposable food and beverage storage container comprising:
    a cylindrical body having an interior surface, the interior surface comprising an embossed portion indicator and an embossed portion line extending entirely along an interior circumference of the cylindrical body so that the embossed portion line and the embossed portion indicator are visible from any viewing angle; and
    a removable lid having a continuous opening therein and a repositionable closure mechanism configured to rotate circumferentially along a bottom portion of the removable lid to open and close the continuous opening from below, the removable lid comprising a cylindrical exterior and a cylindrical bottom portion that is smaller in diameter than the cylindrical exterior; and a pair of opposing and spaced apart mixers fixedly attached to the interior surface of the cylindrical body each of the pair of mixers comprised of a longitudinal frame member, a plurality of lateral frame members and a plurality of openings formed between each of the plurality of lateral frame members; and wherein the cylindrical body and the removable lid are comprised of a biodegradable material.

9. The disposable food and beverage storage container of claim 8, wherein the removable lid further comprises a seal.

10. The disposable food and beverage storage container of claim 9, wherein the seal is comprised of a biodegradable material.

11. A disposable food and beverage storage container comprising:

a cylindrical body having an interior surface, the interior surface comprising an embossed portion indicator and an embossed portion line extending entirely along an interior circumference of the cylindrical body so that the embossed portion line and the embossed portion indicator are visible from any viewing angle; and a removable lid having a spout, a continuous opening, a repositionable closure mechanism configured to rotate circumferentially along a bottom portion of the removable lid to open and close the continuous opening from below, and a lock indicator positioned on a top surface of the removable lid configured to instruct a user how to lock and unlock the removable lid to the cylindrical body; and a pair of opposing and spaced apart mixers fixedly attached to the interior surface of the cylindrical body, each of the pair of mixers comprised of a longitudinal frame member, a plurality of lateral frame members and a plurality of openings formed between each of the plurality of lateral frame members, the longitudinal frame member, and the interior surface of the cylindrical body; and wherein the disposable food and beverage storage container is comprised of a biodegradable material.

12. The disposable food and beverage storage container of claim 11, wherein the removable lid further comprises a biodegradable seal.

\* \* \* \* \*